United States Patent [19]
Hildebrand

[11] 4,056,976
[45] Nov. 8, 1977

[54] MASS RATE OF FLOW METER

[75] Inventors: George Lee Hildebrand, West Boxford, William Allen Healey, Wayland, Thomas Till Sleeper, Marblehead, Stuart Jeffery Hall, Nahant, all of Mass.; Richard A. Pfuntner, Alfred, Maine

[73] Assignee: General Electric Company, Wilmington, Mass.

[21] Appl. No.: 731,405

[22] Filed: Oct. 12, 1976

[51] Int. Cl.² .................................... G01F 1/82
[52] U.S. Cl. .................................... 73/231 M
[58] Field of Search ............ 73/194 M, 231 R, 231 M

[56] References Cited
U.S. PATENT DOCUMENTS

| | | | |
|---|---|---|---|
| 3,232,110 | 2/1966 | Li | 73/231 |
| 3,555,900 | 1/1971 | Bauer et al. | 73/194 |

Primary Examiner—Herbert Goldstein

[57] ABSTRACT

A flowmeter is provided having a housing containing a swirling fluid stream, a rotor which is rotated by the stream, and a turbine which is displaced by the stream; and having a first, transverse angularly discrete, source of magnetic flux means rotating with said rotor and a first, transverse angularly discrete, detector of magnetic flux means mounted on the housing and providing a first output signal when said first source means and said first detector means are in transverse angular alignment, and a second transverse angularly discrete source of magnetic flux means, which may be said first source means, and a flux conductor angularly displaced in conjunction with said turbine, and a second detector of magnetic flux mounted on said housing and providing a second output signal when said second source means and said conductor are in transverse angular alignment.

8 Claims, 4 Drawing Figures

MASS RATE OF FLOW METER

BACKGROUND OF THE INVENTION

This invention relates to mass rate of flow meters of the angular momentum type having a swirl generator for imparting swirl to the measured fluid stream and a torque balance reaction generator for removing the imparted swirl. More particularly, this invention relates to such a meter having an improved readout system for indicating the mass rate of flow.

Mass rate of flow meters of the angular momentum type have become conventional for fluid streams, for example, the flow of fuel to an engine. Such flowmeters comprise a casing through which the measured fluid stream flows and in which are disposed a swirl generator and a reaction turbine. The swirl generator imparts an angular velocity to the stream which is removed by a reaction turbine which is restrained against free rotation. The fluid torque exerted in the reaction turbine is proportional to the product of the mass rate of flow of the stream and the angular velocity of the stream.

Jennings in U.S. Pat. No. 2,714,310, issued on Aug. 2, 1955 disclosed the basic system of such a meter utilizing a swirl generator or rotor driven by a constant speed motor, and a turbine restrained by a spiral spring. The angular displacement of the turbine is read out either directly visually, or by a synchro system.

Pustell et al in U.S. Pat. No. 3,538,767 issued on Nov. 10, 1970, and Bauer et al. in U.S. Pat. No. 3,555,900 issued on Jan. 19, 1971, show an improved system wherein the swirl generator includes a plurality of fixed channels, the reaction turbine is restrained by an electromagnetic torque motor, and a speed turbine is driven by the swirling stream. Rotation of the speed turbine generates a pulse train whose pulse repetition rate is a function of angular velocity. Angular displacement of the reaction turbine generates a signal which is a function of the mass flow rate. The two signals are multiplied to energize the torque motor.

Karlby et al. in U.S. Pat. No. 3,164,017 issued on Jan. 5, 1965 shows a Jennings type meter. The swirl generator is motor driven and has a first knife edge magnet fixed in its periphery and a sensing coil disposed in the housing to detect the passage of this magnet. A second knife edge magnet is fixed in its periphery and a second sensing coil is fixed to an arm which is fixed to the reaction turbine to detect the passage of this second magnet. The two pulses so generated each cycle serve to pass clock pulses to a counter to provide an indication of the displacement of the reaction turbine.

Li in U.S. Pat. No. 3,232,110 issued Feb. 1, 1966 shows a mass flow rate meter having a fixed swirl generator; a free running speed turbine and an angular displacement constrained reaction turbine. A permanent magnet is fixed to the speed turbine. A first sensing coil is fixed to the housing to sense the passage of the magnet during each revolution of the speed turbine. A second sensing coil is fixed to the reaction turbine to sense the passage of the magnet during each revolution of the speed turbine. The time between the two sensings is a function of the displacement of the reaction turbine.

The Karlby et al. and Li mechanisms each respectively require a moving sensing coil carried by the reaction rotor with flexible leads carried through the flowing stream and through the water-tight housing, all providing a probable site for early malfunction.

SUMMARY OF THE INVENTION

It is, therefore, an object of this invention to provide a system for the readout of the velocity of the rotor and of the displacement of the turbine in a flowmeter wherein all of the sensing coils and their conductors are external to the flowing stream and are stationary.

A feature of this invention is the provision of a flowmeter having a housing containing a swirling fluid stream, a rotor which is rotated by the stream, and a turbine which is displaced by the stream; and having a first, transverse angularly discrete, source of magnetic flux means rotating with said rotor and a first, transverse angularly discrete, detector of magnetic flux means mounted on the housing and providing a first output signal when said first source means and said first detector means are in transverse angular alignment, and a second transverse angularly discrete source of magnetic flux means, which may be said first source means, and a flux conductor angularly displaced in conjunction with said turbine, and a second detector of magnetic flux mounted on said housing and providing a second output signal when said second source means and said conductor are in transverse angular alignment.

BRIEF DESCRIPTION OF THE DRAWING

These and other objects, features and advantages of this invention will be apparent from the following specification thereof taken in conjunction with the accompanying drawing, in which:

FIG. 4 is an end view of the flowmeter of FIG. 1.

DESCRIPTION OF THE EMBODIMENT

Figure 1:
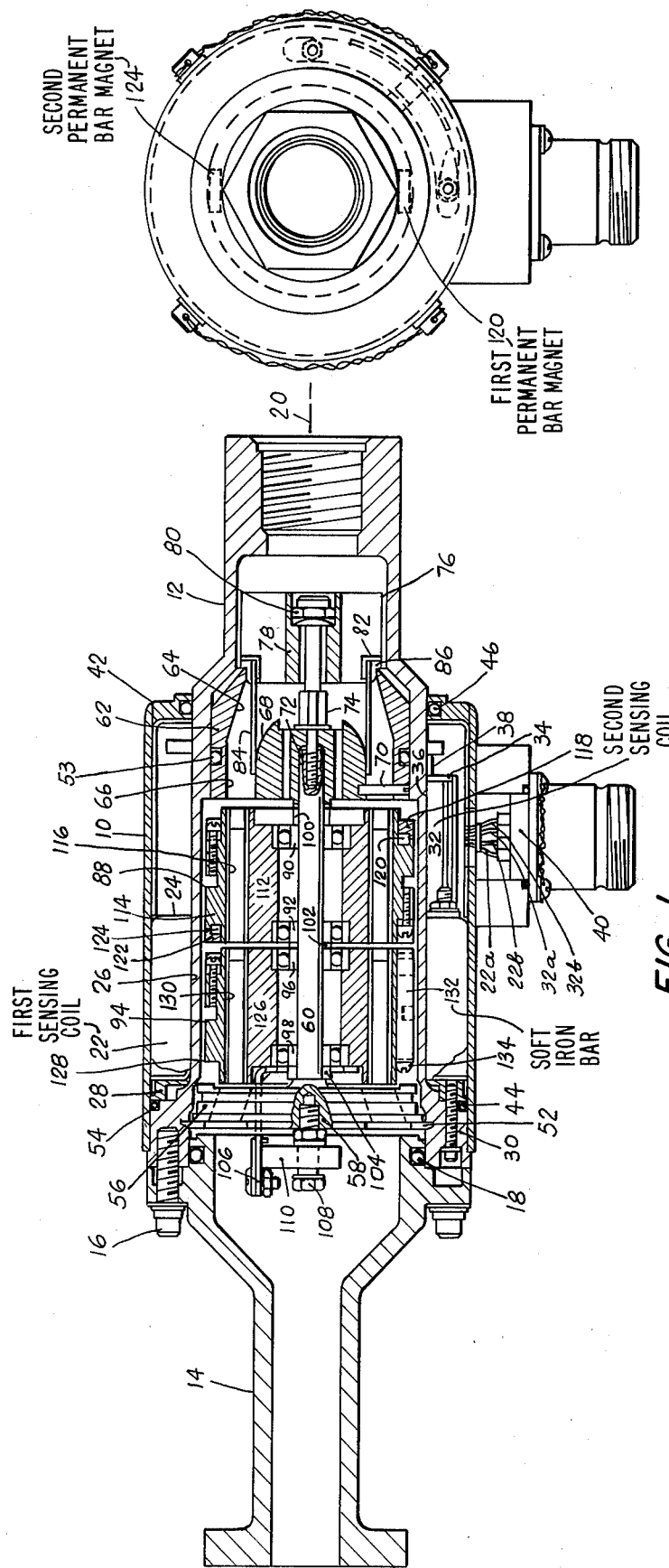
FIG. 1 is a longitudinal view, in cross-section, of a mass rate flowmeter embodying this invention.

As shown in FIG. 1 an exemplary flowmeter, similar to the flowmeter shown in U.S. Pat. No. 3,538,767, comprises a housing having an inlet end part 12 and an outlet end part 14 made of nonferrous material and clamped together by a plurality of cap screws 16 and sealed by an O-ring 18, all having a longitudinal axis 20. A first coil 22, with leads 22a and 22b, having a longitudinal axis which is coincident with the axis 20, is secured in a magnetic shield 24 which is open at its inner cylindrical wall 26, and is fixed to a bracket 28, which is clamped to a flange 30 of the part 14. A second coil 32, with leads 32a and 32b, having a longitudinal axis which is perpendicular to the axis 20, is secured in a shield 34 which is open at its inner wall 36, and is fixed to a shell 42. The coil 32 is fixed to a bracket 38. The two leads 22a and 22b from the coil 22, and the two leads 32a and 32b from the coil 32 are connected to respective contacts in a connector 40. The connector 40 is fixed to the shell 42 which is secured to the part 12, enclosing two coils, and sealed thereto by two O-rings 44 and 46.

An inner assembly is captured within the housing by a retaining ring 52, and centralized by two O-rings 53 and 54. The assembly includes an aft strut assembly which comprises a stationary annular disk 56 having a plurality of radial struts to support a central disk 58 from which a shaft 60 extends longitudinally. A forward strut assembly comprises a stationary annulus 62 having an initial interior conical surface 64 and a following interior cylindrical surface 66. A swirl generator 68 having skewed vanes is fixed by a plurality of struts 70 to the annulus 62, and has a bore 72 which receives the forward end of the shaft 60 which is clamped therein by means of a stud 74. A plurality of longitudinally extending vanes 76 extend from central rod 78 which is counter-bored and is clamped to the annulus 62 and the swirl generator 68 by a nut 80 on the stud 74. A flanged ring 82 has fixed thereto a slotted conduit 84 providing a plurality of spring fingers encircling the swirl generator and fits on a second flanged ring 86 and is clamped between the annulus 62 and the vanes 76.

A rotor 88 is journaled on the shaft 60 by a pair of ball bearings 90 and 92. A turbine 94 is journaled on the shaft 60 by a pair of ball bearings 96 and 98. Thrust bearings 100, 102 and 104 space the rotor and turbine along the shaft. An arm 106 is fastened to the aft face of the turbine. A shaft 108 is fixed to the stationary disk 58. A flat band, helical spring 110 is clamped between the arm and the shaft.

The rotor 88 includes an inner hub 112, an outer annulus 114, and a plurality of tubes 116 packed tightly in an annular row therebetween. A forward ring 118 is fixed to the annulus 114 and clamps a first permanent bar magnet 120 into the periphery of the rotor. The magnet is disposed with its north-south magnetic axis lying in a plane which is a chord of the periphery of the rotor and on a plane which is transverse to the axis 20. An aft ring 122 is fixed to the annulus 114 and clamps a second permanent bar magnet 124 into the periphery of the rotor. This magnet is also disposed with its north-south magnetic axis lying in a plane which is a chord of the periphery of the rotor and in a plane which is transverse to the axis 20.

The turbine 94 includes an inner hub 126, an outer annulus 128 and a plurality of tubes 130 packed tightly in an annular row therebetween. A forward ring is fixed to the annulus 128 and may have weights added or removed therefrom for balancing the turbine. A longitudinal slot 130 is provided into the periphery of the turbine and a soft iron bar 132 is disposed therein and held by a screw 134.

Figure 2:
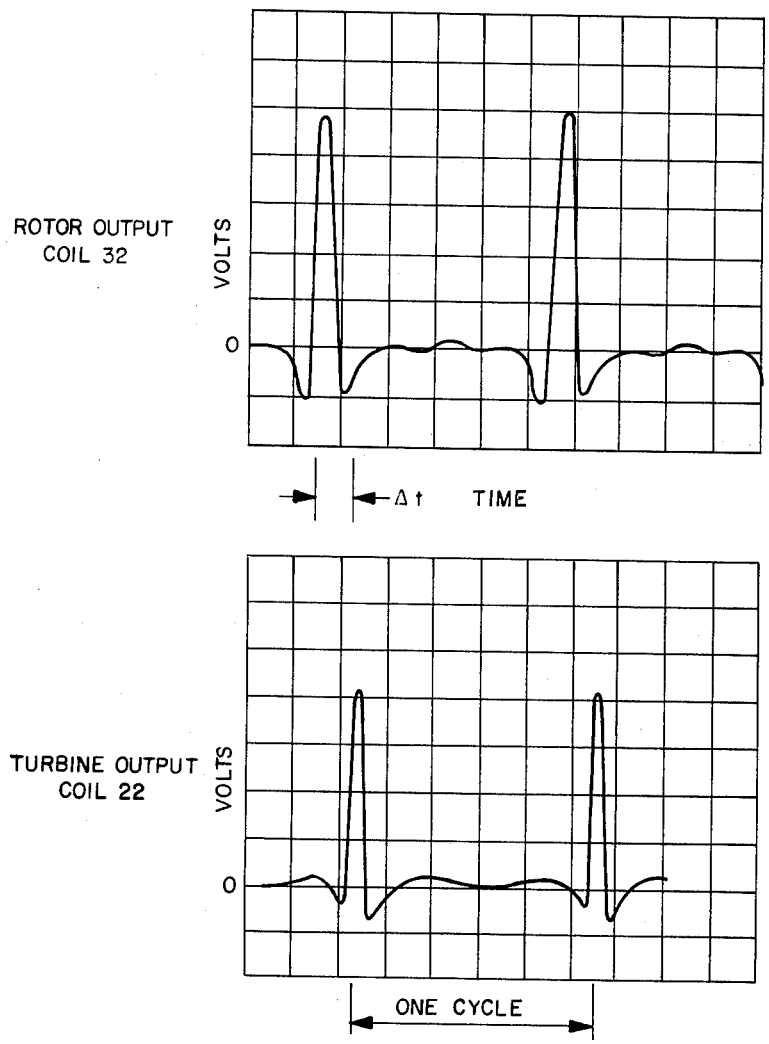
FIG. 2 is a plot of the output signals of the sensing means of the flowmeter of FIG. 1.

The transverse plane in which the first bar magnet 120 lies also intersects the longitudinal axis of the radially oriented sensing coil 32. Each time the magnet passes the coil it develops a pulse train as shown in FIG. 2 as first the field from one pole passes, inducing a first voltage pulse, then the change in fields passes inducing a second higher voltage pulse of opposite polarity, and finally the field from the other pole passes inducing a third voltage pulse similar to said first voltage pulse. The absolute voltage difference between the peak of the second pulse and the peaks of the first and third pulses, is significantly greater than a pulse provided by a similar magnet disposed on a radial orientation so that a passing field is provided by only one pole.

Figure 3:
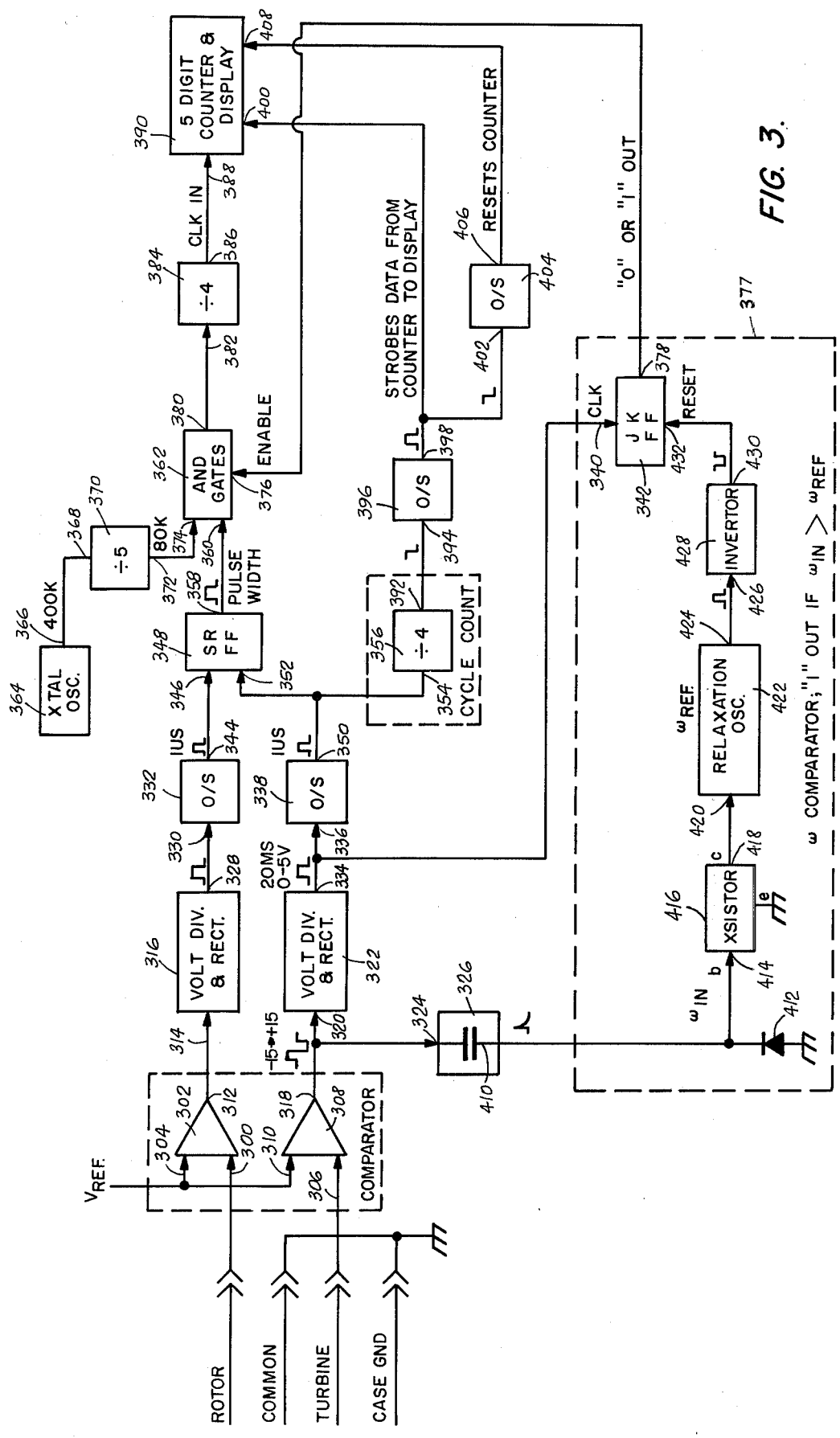
FIG. 3 is a block diagram schematic of an electrical readout circuit for the flowmeter of FIG. 2.

The transverse plane in which the second bar magnet 124 lies, and the cylinder in which the soft iron bar 132 lies, both lie in the length of the encircling sensing coil 22. When the bar magnet 124 passes the iron bar 132, which bar acts as a magnetic conductor for the fields of the bar magnet, it also induces first, second and third voltage pulses in the coil 22, due to the first field, change of field and second field respectively, as shown in FIG. 3.

In the embodiment shown in FIG. 1, the first and second bar magnets are disposed 180° apart in the periphery of the rotor, and the iron bar is disposed 180° away from the radial sensing coil when the turbine is in its free or zero fluid flow condition. Thus in the negligible flow condition the pulse trains generated by the first and second bar magnets in their respective sensing coils occur simultaneously. When the turbine is displaced angularly, the pulse trains will be displaced in time. Each complete rotation of the rotor will provide one set of pulse trains in each coil.

The operation of the mass rate of flow meter may be reviewed as follows: The fluid stream flows in, past the vanes, over the swirl generator 68 and is provided with a substantially constant angular velocity. The rotating fluid stream enters the passageways of the rotor provided by the tubes 116 and causes the unrestrained rotor to rotate at the average velocity of the stream. The angular velocity of the rotor accurately represents the angular velocity of the fluid stream as it leaves the rotor and enters the passageways of the turbine provided by the tubes 130.

The angular momentum of the fluid stream angularly displaces the turbine against the bias of the helical spring 110, which turbine is stationary under steady state flow conditions, with the angular momentum completely removed from the fluid stream.

In accordance with Newton's Second Law, there is a fluid torque $T_F$ which is proportional to the rate of change of angular momentum in the turbine:

$$T_F \alpha\ M\omega \tag{1}$$

where
$T_F$ = torque produced in the turbine by the fluid streams,
$M$ = mass rate of flow of the fluid stream, and
$\omega$ = rotational velocity of the fluid stream leaving the rotor and entering the turbine.

Under the influence of the fluid torque $T_F$, the turbine is displaced angularly until the torque from the restraining spring 110 is equal and opposite to the fluid torque, and the turbine is balanced under steady state flow.

$$T_S \alpha\ \theta, \tag{2}$$

where
$T_S$ = torque produced in the spring
$\theta$ = angle of deflection of the spring.

Under steady state, balanced conditions, equations (1) and (2) can be equated to give:

$$M\omega\ \alpha\ \theta. \tag{3}$$

If at any time $T_F$ and $T_S$ are not equal, the difference in torque will move the turbine until a balance of torques again exists.

The sensing/readout means measures the time that it takes for a reference point on the rotor to move through the turbine displacement angle $\theta$. Then:

$$\theta = \omega\ \Delta t \tag{4}$$

where
$\omega$ = rotor angular velocity as for equation (1)
$\Delta t$ = elapsed time.

From equations (3) and (4):

$$M\omega\ \alpha\ \omega\ \Delta t,$$

and $$M\ \alpha\ \Delta t \tag{5}$$

The sensing/readout means disclosed in FIG. 1 includes the magnet 120 and its sensing coil 32, and the magnet 124, the iron bar 132, and their sensing coil 22. Other mechanisms which detect magnetic flux may be substituted for the coils. Other systems of source and detector, and source, conductor and detector may be utilized. A single source, carried by the rotor, may be substituted for the two sources 120 and 124 shown.

The angular location of the turbine can be identified by use of the iron bar 132. The zero deflection angular position of the turbine, that is, the iron bar, and the angular position of the sensing coil 32 have a fixed, known relationship, and, therefore, the pulse train produced by the passage of the magnet 120 past the coil 32 provides an indication of the start of the displacement angle $\theta$. The magnet 123 and the magnet 120 have a fixed, known relationship, and, therefore, the pulse train produced by the passage of the magnet 124 past the iron bar 132 provides an indication of the end of the displacement angle $\theta$.

As the mass rate of flow increases, the displacement angle $\theta$ increases, and the period of time between the two trains of pulses increases. This period of time is proportional to the mass rate of flow as shown by equation (5).

The readout circuit is shown in FIG. 3. The pulse train from the coil 32, which is in effect the timing cycle start pulse, is applied to a first input 300 of a first comparator circuit 302, whose second input 304 is coupled to a reference voltage source $V_{REF}$. The pulse train from the coil 22, which is in effect the timing cycle stop pulse, is applied to a first input 306 of a second comparator circuit 308, whose second input 310 is also coupled to the reference voltage source $V_{REF}$. Each of the comparators has a 5 mv hysteresis and $V_{REF}$ is 10 mv, to preclude spurious output signals due to noise, and to provide a clean square wave output signal. The output 312 of the comparator 302 is coupled to the input 314 of a voltage divider and rectifier circuit 316 to provide a unidirectional square wave. Similarly, the output 318 of the comparator 308 is coupled to the input 320 of a voltage divider and rectifier circuit 322 to provide a unidirectional square wave, and to the input 324 of a coupling capacitor 326. The output 328 of the circuit 316 is coupled to the input 330 of a one-shot multi-vibrator 332 which provides a pulse of narrow, uniform width. The output 334 of the circuit 322 is coupled to the input 336 of a one-shot multi-vibrator 338 which provides a pulse of narrow, uniform width, and to the clock input 340 of a flip-flop 342. The output 344 of the Mv 332 is coupled to the set input 346 of a set-reset flip-flop 348. The output 350 of the Mv 338 is coupled to the reset input 352 of the flip-flop 348, and to the input 354 of a divided-by-4 circuit 356. The output 358 of the flip-flop 348 is coupled to a first input 360 of an AND gate 362 and is a square wave whose pulse width is a function of the displacement angle $\theta$ of the turbine. A crystal controlled oscillator 364 has an output 366 which provides a 400 KHz signal and is coupled to the input 368 of a divide-by-5 circuit 370 which has an output 372 which provides an 80 KHz signal and is coupled to a second input 374 of the AND gate 362. A third input 376 is coupled to the output 378 of the flip-flop 342. The flip-flop 342 is part of an $\omega$ comparator circuit 377 whose function is to disable the readout of flow rates below a predetermined threshold. The output 380 of the gate 362, consisting of the set-reset flip-flop 348 gated oscillator pulses, is coupled to the input 382 of a second divide-by-4 circuit 384, whose output 386 is coupled to the input 388 of a five denary digit counter and display circuit 390. The output 392 of the first divide-by-4 circuit 356 is coupled to the input 394 of a one-shot multi-vibrator 396 whose output 398 is coupled to the shift control input 400 of the display circuit 390 to shift the accumulated count from the counter portion thereof to the display portion thereof. The output 398 is also coupled to the input 402 of a one-shot multi-vibrator 404 whose output 406 is coupled to the reset control input 408 of the display circuit 390 to reset the counter portion thereof to zero. In effect, the display circuit 390 counts the average count of a group of four successive cycles and then displays that count for the time period occupied by the next group of four successive cycles while counting the average count of that next group.

The $\omega$ comparator 377 comprises the coupling capacitor 326 whose output 410 is rectified by a diode 412 and coupled to the base input 414 of a transistor 416 whose emiter output 418 is coupled to the input 420 of a relaxation oscillator 422. The output 424 of the oscillator is coupled to the input 426 of an invertor 428 whose output 430 is coupled to the reset control input 432 of the flip-flop 342. The relaxation oscillator constructs a minimum reference pulse repetition rate [prf] equivalent to extremely small angular displacements of the turbine, i.e. low mass rates of flow for which the display 390 is to show zero. The turbine pulses from the comparator 308 attempt to set the flip-flop 342 while the relaxation oscillator pulses are resetting that flip-flop 342. The output 378 of that flip-flop 342 is only set, and thereby enables the AND gate 362, if and when the turbine pulse repetition rate exceeds the minimum reference pulse repetition rate. The transistor 416 is used to preclude ambiguities when the turbine rate is very close to the reference rate, by partially discharging the coupling capacitor and thereby forcing the oscillator to synchronize within the turbine prf when the two prf's approach identity, maintaining the flip-flop 342 in its reset mode.

What is claimed is:
1. In a mass rate of flow meter, having:
a housing,
first means for passing a fluid stream and having a first element rotating at the average angular velocity of the fluid stream,
second means for receiving the fluid stream and for removing substantially all of the angular velocity therefrom, having a second element having a first angular orientation at a first angular momentum of the fluid stream, and for translating through an angular displacement from said first angular orientation and which displacement is a function of time rate of change of angular momentum of the fluid stream from said first angular momentum,
the improvement of:
a first source of magnetic flux fixed to said first element of said first means and rotating therewith,
a first flux change detector fixed to said housing on a first radial orientation for detecting the passage of said first source through said radial orientation and for providing a first signal in response thereto,
a second flux change detector fixed to said housing having an annular orientation to said second means for detecting a flux change and for providing a second signal in response thereto, a second source of flux having a third element fixed to said first element of said first means and rotating therewith and a fourth element fixed to said second element of said second means and displaced therewith, and providing a source of flux change when both said third and fourth elements are in conjunction, which change is detected by said second detector, an elapsed time meter which is turned on by said first signal and is turned off by said second signal, thereby to provide an indication of elapsed time which is a function of the time required for said first element to rotate through the displacement of said second element, which elapsed time is a function of the mass rate of flow of the stream.

2. The improvement according to claim 1 wherein:

said first element of said first means and said second element of said second means rotate about a common longitudinal axis, said first source of magnetic flux is a first bar magnet having its polar axis lying in a plane which is perpendicular to said common longitudinal axis, and lying along a chord which is perpendicular to a radius from said common longitudinal axis.

3. The improvement according to claim 2 wherein:

said first flux change detector is a first coil wound about a first coil axis which lies along a radius to said common longitudinal axis.

4. The improvement according to claim 1 wherein:

said first element of said first means and said second element of said second means rotate about a common longitudinal axis, said third element of said second source of flux is a second bar magnet having its polar axis lying in a plane which is perpendicular to said common longitudinal axis, and lying along a chord which is perpendicular to a radius from said common longitudinal axis.

5. The improvement according to claim 4 wherein:

said fourth element of said second source of flux is a magnetic flux conductor disposed at substantially the same radial distance from said common longitudinal axis as said polar axis of said second bar magnet, whereby said conductor conducts flux from said second bar magnet when both are at the same angular orientation to said common longitudinal axis.

6. The improvement according to claim 5 wherein:

said second flux change detector is a second coil wound about a second coil axis which lies along said common longitudinal axis, whereby said second coil provides said second signal when said conductor conducts flux.

7. The improvement according to claim 1 wherein:

each complete rotation of said first element of said first means provides a cycle of operation and a set of first and second signals, said elapsed time meter provides an indication of elapsed time per cycle which is an average of a predetermined number of successive cycles.

8. The improvement according to claim 1 wherein:

said elapsed time meter provides an indication of elapsed time only when the elapsed time is greater than a predetermined value.

* * * * *